United States Patent
Kikuchi

(10) Patent No.: US 7,432,318 B2
(45) Date of Patent: Oct. 7, 2008

(54) RUBBER COMPOSITION FOR A TIRE AND PNEUMATIC TIRE USING THE SAME

(75) Inventor: Naohiko Kikuchi, Kobe (JP)

(73) Assignee: Sumitomo Rubber Industries, Ltd., Kobe-shi (JP)

( * ) Notice: Subject to any disclaimer, the term of this patent is extended or adjusted under 35 U.S.C. 154(b) by 562 days.

(21) Appl. No.: 11/011,424

(22) Filed: Dec. 15, 2004

(65) Prior Publication Data
US 2005/0171260 A1 Aug. 4, 2005

(30) Foreign Application Priority Data
Jan. 30, 2004 (JP) ............................. 2004-023035

(51) Int. Cl.
*C08K 5/09* (2006.01)
*B60C 1/00* (2006.01)

(52) U.S. Cl. .................. 524/284; 524/394; 152/151

(58) Field of Classification Search ............... 524/284, 524/394; 152/151
See application file for complete search history.

(56) References Cited

U.S. PATENT DOCUMENTS

| 5,587,417 A * | 12/1996 | Nakane et al. | 524/495 |
| 6,448,318 B1 * | 9/2002 | Sandstrom | 524/284 |
| 6,759,456 B2 * | 7/2004 | Kikuchi | 524/81 |
| 7,119,147 B2 * | 10/2006 | Kikuchi | 525/193 |
| 2003/0100643 A1 * | 5/2003 | Kikuchi | 524/265 |

FOREIGN PATENT DOCUMENTS

| EP | 0 659 821 A1 | 6/1995 |
| EP | 0 678 551 A1 | 10/1995 |
| EP | 1 134 254 A1 | 9/2001 |
| JP | 4-189850 A | 7/1992 |
| JP | 4-224839 A | 8/1992 |
| JP | 4-261443 A | 9/1992 |
| JP | 7-26066 A | 1/1995 |
| JP | 7-216140 A | 8/1995 |
| JP | 9-29857 A | 2/1997 |
| JP | 11-293040 A | 10/1999 |
| JP | 2001-89619 A | 4/2001 |
| JP | 2001-253973 A | 9/2001 |
| JP | 2003-64222 A | 3/2003 |
| JP | 2003-213039 A | 7/2003 |
| WO | WO-93/19578 A2 | 10/1993 |

* cited by examiner

*Primary Examiner*—Tae H Yoon
(74) *Attorney, Agent, or Firm*—Birch, Stewart, Kolasch & Birch, LLP

(57) ABSTRACT

The present invention provides a tread rubber composition for a tire, which highly controls energy loss in a wide frequency range and has high frictional force especially on wet road surfaces, and a tire using the same. Specifically, the present invention provides a rubber composition for a tire comprising 5 to 100 parts by weight of a fatty acid obtained from a vegetable oil having an iodine value of at least 80, based on 100 parts by weight of a rubber component, wherein the ratio of tan$\delta$ at 60° C. to tan$\delta$ at 0° C. is at least 0.85, and a pneumatic tire using the rubber composition.

14 Claims, No Drawings

RUBBER COMPOSITION FOR A TIRE AND PNEUMATIC TIRE USING THE SAME

BACKGROUND OF THE INVENTION

The present invention relates to a rubber composition for a tire using fatty acid obtained from vegetable oil as a softening agent and a tire using the rubber composition.

Conventionally, petroleum oil such as aromatic oil has been used as a softening agent in rubber compositions for tires. However, when petroleum oil is compounded, rolling resistance of a tire increases and there is the problem that fuel efficiency becomes poor. Also, in recent years, much importance has been placed on global environmental problems and a new softening agent to replace petroleum oil is desired.

In order to solve the above problems, known is a rubber composition for a tire using vegetable oil of high iodine value as a softening agent (see JP-A-2003-213039). However, the energy loss in a wide frequency range cannot be controlled and there is the problem that frictional force is insufficient.

SUMMARY OF THE INVENTION

The object of the present invention is to provide a tread rubber composition for a tire, which can control energy loss in a wide frequency range and has high frictional force particularly on wet road surfaces, and a tire using the composition.

The present invention relates to a rubber composition for a tire comprising 5 to 100 parts by weight of a fatty acid obtained from a vegetable oil having an iodine value of at least 80, based on 100 parts by weight of a rubber component; wherein the ratio of tan$\delta$ at 60° C. to tan$\delta$ at 0° C. is at least 0.85.

The fatty acid preferably contains at least 80% by weight of unsaturated fatty acid having at least 18 carbon atoms.

The vegetable oil is preferably at least one vegetable oil selected from the group consisting of rapeseed oil, soya bean oil and linseed oil.

Also, the present invention relates to a pneumatic tire using the rubber composition for a tread.

DETAILED DESCRIPTION

The rubber composition for a tire of the present invention comprises a rubber component and a fatty acid.

Examples of the rubber component are styrene-butadiene copolymer (SBR), isoprene rubber, polybutadiene rubber (BR), low cis 1,2-butadiene rubber, butyl rubber (IIR), halogenated butyl rubber, acrylonitrile-butadiene rubber (NBR), acrylonitrile-styrene-butadiene copolymer rubber, chloroprene rubber, ethylene-propylene copolymer rubber, styrene-isoprene copolymer rubber, styrene-isoprene-butadiene copolymer rubber, isoprene-butadiene copolymer rubber, chlorosulfonated polyethylene, acrylic rubber, epichlorohydrine rubber, silicone rubber and urethane rubber. These can be used alone or two or more kinds can be used together and when mixed, the mixing ratio is not particularly limited. Of these rubber components, SBR is preferably used, as high gripping properties can be obtained.

The fatty acid used in the rubber composition for a tire of the present invention is obtained from vegetable oil. Usually, vegetable oil has a structure called triacyl glyceride, in which 3 molecules of fatty acid are bonded by ester to 1 glycerin molecule.

The iodine value of the vegetable oil, which gives the fatty acid used in the present invention, is at least 80, preferably at least 100. When the iodine value is less than 80, the effect of softening the rubber is small, the fatty acid tends to bleed out from the vulcanized rubber and the change in properties is large when heat aged.

Examples of the vegetable oil are olive oil, cotton seed oil, rape seed oil, corn oil, sesame oil, soya bean oil, safflower oil and linseed oil. Of these, from the viewpoint that an unsaturated fatty acid component having at 18 or more carbon atoms is contained in a large amount, the vegetable oil is preferably at least one kind of vegetable oil selected from the group consisting of cotton seed oil, rape seed oil, corn oil, sesame oil, soya bean oil, safflower oil and linseed oil, more preferably at least one vegetable oil selected from the group consisting of rape seed oil, corn oil, sesame oil, soya bean oil, safflower oil and linseed oil, particularly preferably at least one vegetable oil selected from the group consisting of rape seed oil, soya bean oil and linseed oil.

The fatty acid used in the present invention (vegetable oil fatty acid) refers to monocarboxylic acid obtained by hydrolyzing vegetable oil and removing glycerin therefrom. Commercially available monocarboxylic acid can be used.

The vegetable oil fatty acid used in the present invention preferably contains at least 80% by weight, more preferably at least 85% by weight, of unsaturated fatty acid having at least 18 carbon atoms. By containing at least 80% by weight of unsaturated fatty acid having at least 18 carbon atoms, a softening effect is obtained. Furthermore, the fatty acid has difficulty escaping from the rubber, as the double bonds in the fatty acid crosslink with sulfur, and change in properties of the rubber due to heat aging can be suppressed. On the other hand, when the amount of saturated fatty acid and unsaturated fatty acid having less than 18 carbon atoms is more than 20% by weight, the congealing point of the vegetable oil rises and low temperature properties of the rubber tend to become poor.

The rubber composition for a tire of the present invention contains 5 to 100 parts by weight of vegetable oil fatty acid based on 100 parts by weight of the rubber component. The lower limit of the content of the vegetable oil fatty acid is preferably 10 parts by weight and the upper limit is preferably 60 parts by weight. When the content is less than 5 parts by weight, the softening effect of rubber is insufficient and when the content is more than 100 parts by weight, the viscosity of the rubber composition becomes too low that processability decreases.

With respect to the rubber composition of the present invention, the ratio of tan$\delta$ at 60° C. to tan$\delta$ at 0° C. is at least 0.85, preferably at least 1.0. When the ratio of the tangent value is less than 0.85, high friction coefficient cannot be obtained.

In the rubber composition of the present invention, fillers such as carbon black, silica, clay and aluminum hydroxide can also be used. Also, other additives such as process oil, antioxidants, stearic acid, zinc oxide and wax and vulcanizing agents such as sulfur and vulcanization accelerators can be compounded accordingly.

In the case that silica is used as a filler, the amount thereof is preferably 20 to 150 parts by weight based on 100 parts by weight of the rubber component. When the amount is less than 20 parts by weight, the necessary gripping properties may not be obtained. When the amount is more than 150 parts by weight, the viscosity of the kneaded rubber becomes too high that processability tends to become poor.

When silica is used as a filler, a silane coupling agent can also be used. The amount of the silane coupling agent is preferably 5 to 20 parts by weight based on 100 parts by weight of the silica. When the amount is less than 5 parts by weight, the viscosity of the kneaded rubber becomes too high that processability tends to become poor. When the amount is more than 20 parts by weight, costs tend to increase.

The pneumatic tire of the present invention is prepared by the usual method using the rubber composition for the tire tread. That is, the rubber composition is extruded into the form of a tire tread before vulcanization and then laminated together by the usual method on a tire forming machine to form an unvulcanized tire. The unvulcanized tire is heated and pressurized in the vulcanizer to obtain a tire.

The present invention is explained in detail based on Examples below, but not limited thereto.

The chemicals used in Examples and Comparative Examples are described below.

SBR: SBR1502 available from Sumitomo Chemical Co., Ltd.

BR: BR 150L available from Zeon Corporation

Silica: VN3 available from Degussa Co.

Silane coupling agent: Si-69 (bis(3-triethoxysilylpropyl)tetrasulfide) available from Degussa Co.

Rape seed oil: Refined Rape Seed Oil (S) available from Nisshin Oillio, Ltd. (Iodine Value 116)

Soya bean oil: Refined Soya Bean Oil (S) available from Nisshin Oillio, Ltd. (Iodine Value: 131)

Linseed oil: N/B Linseed Oil available from Nisshin Oillio, Ltd. (Iodine Value 191)

Aromatic oil: Process X-140 available from Japan Energy Corporation

Antioxidant: Ozonone 6C available from Seiko Chemicals Co., Ltd.

Wax: SUN NOC Wax available from Ohuchi Shinko Kagaku Kogyo Co., Ltd.

Stearic acid: KIRI available from NOF Corporation

Zinc oxide: Zinc Oxide 2 available from Mitsui Mining and Smelting Co., Ltd.

Sulfur: powdery sulfur available from Karuizawa Iou Kabushiki Kaisha

Vulcanization accelerator: Nocceler CZ available from Ohuchi Shinko Kagaku Kogyo Co., Ltd.

Rape seed fatty acid: Rape Seed Fatty Acid available from Nisshin Oillio, Ltd. (obtained by hydrolysis of rape seed oil having iodine value of 116; unsaturated fatty acid component having at least 18 carbon atoms: 91.3% by weight))

Soya bean fatty acid: Soya Bean Fatty Acid (S) available from Nisshin Oillio, Ltd. (obtained by hydrolysis of soya bean oil having iodine value of 131; unsaturated fatty acid component having at least 18 carbon atoms: 84.9% by weight))

Linseed fatty acid: Linseed Fatty Acid available from Nisshin Oillio, Ltd. (obtained by hydrolysis of linseed oil having iodine value of 191; unsaturated fatty acid component having at least 18 carbon atoms: 91.5% by weight))

EXAMPLES 1 to 5 and COMPARATIVE EXAMPLES 1 and 2

According to the composition shown in Table 1, an unvulcanized rubber composition was prepared by kneading the component in a Banbury mixer and samples of Examples 1 to 5 and Comparative Example 1 to 2 were prepared by vulcanizing for 25 minutes at 165° C.

TABLE 1

| Composition | Ex. | | | | | Com. Ex. | |
|---|---|---|---|---|---|---|---|
| (parts by weight) | 1 | 2 | 3 | 4 | 5 | 1 | 2 |
| SBR | 70 | 70 | 70 | 70 | 70 | 70 | 70 |
| BR | 30 | 30 | 30 | 30 | 30 | 30 | 30 |
| Silica | 100 | 100 | 100 | 100 | 100 | 100 | 100 |
| Silane coupling agent | 8 | 8 | 8 | 8 | 8 | 8 | 8 |
| Rapeseed fatty acid | 60 | — | — | 30 | 30 | — | — |
| Soya bean fatty acid | — | 60 | — | 30 | — | — | — |
| Linseed fatty acid | — | — | 60 | — | — | — | — |
| Rapeseed oil | — | — | — | — | — | — | 60 |
| Aromatic oil | — | — | — | — | 30 | 60 | — |
| Antioxidant | 2.0 | 2.0 | 2.0 | 2.0 | 2.0 | 2.0 | 2.0 |
| Wax | 2.0 | 2.0 | 2.0 | 2.0 | 2.0 | 2.0 | 2.0 |
| Stearic Acid | 2.0 | 2.0 | 2.0 | 2.0 | 2.0 | 2.0 | 2.0 |
| Zinc oxide | 3.0 | 3.0 | 3.0 | 3.0 | 3.0 | 3.0 | 3.0 |
| Sulfur | 2.5 | 2.5 | 2.5 | 2.5 | 2.5 | 2.0 | 2.0 |
| Vulcanization accelerator | 1.0 | 1.0 | 1.0 | 1.0 | 1.0 | 1.0 | 1.0 |

The friction coefficient and tanδ of Examples and Comparative Examples were measured by the following methods and the results are shown in Table 2.

(Measurement of tanδ)

Using a viscoelastometer available from Iwamoto Corporation, the values of tanδ at 0° C. (A) and tanδ at 60° C. (B) were found from the tanδ temperature distribution curve measured under the conditions of frequency of 10 Hz, initial strain of 10%, amplitude of ±0.25% and temperature increase rate of 2° C./minute. The (B)/(A) value was calculated. A (B)/(A) value of at least 0.85 indicates that energy loss in a wide frequency range can be highly controlled, thus being favorable.

(Measurement of Friction Coefficient (Peak μ))

Using a flat belt-type friction tester FR-5010 available from Ueshima Seisakusho, the maximum friction coefficient when decreasing speed from 20 km/h was found. Safety walk #240 was used as the contact road surface and the test was conducted under wet conditions. The friction coefficient of Comparative Example 1 was considered to be 100 and each was represented as an index. The large the value, the higher and better the frictional force.

TABLE 2

| | Ex. | | | | | Com. Ex. | |
|---|---|---|---|---|---|---|---|
| | 1 | 2 | 3 | 4 | 5 | 1 | 2 |
| Evaluation results | | | | | | | |
| tan δ at 0° C. (A) | 0.184 | 0.190 | 0.186 | 0.186 | 0.206 | 0.226 | 0.200 |
| tan δ at 60° C. (B) | 0.215 | 0.224 | 0.222 | 0.220 | 0.204 | 0.163 | 0.168 |

TABLE 2-continued

|  | Ex. | | | | | Com. Ex. | |
| --- | --- | --- | --- | --- | --- | --- | --- |
|  | 1 | 2 | 3 | 4 | 5 | 1 | 2 |
| (B)/(A) | 1.17 | 1.18 | 1.19 | 1.18 | 0.99 | 0.72 | 0.84 |
| Friction coefficient (peak μ) | 108 | 113 | 109 | 110 | 106 | 100 | 96 |

It can be seen that the rubber compositions of Examples 1 to 5 of the present invention can highly control energy loss in a wide frequency range, as the ratio of tanδ at 0° C. and 60° C. is at least 0.85, and have high frictional force, as the friction coefficient is large.

According to the present invention, by compounding a specific amount of a fatty acid obtained from a vegetable oil having an iodine value of at least 80 to a rubber component, a rubber composition for a tire is provided, which exhibits favorable softening effect and hysteresis loss over a wide frequency range and has high frictional force to road surfaces.

What is claimed is:

1. A rubber composition for a fire comprising: a rubber component; and 5 to 100 parts by weight of a fatty acid obtained by hydrolyzing a vegetable oil having an iodine value of at least 80, based on 100 parts by weight of the rubber component, wherein the ratio of tanδ at 60° C. to tanδ at 0° C. is at least 0.85, wherein said vegetable oil is at least one vegetable oil selected from the group consisting of rapeseed oil, soya bean oil and linseed oil.

2. The rubber composition for a tire of claim 1, wherein said fatty acid contains at least 80% by weight of unsaturated fatty acid having at least 18 carbon atoms.

3. A pneumatic tire having a tread formed from the rubber composition for a tire of claim 1.

4. A pneumatic tire having a tread formed from the rubber composition for a tire of claim 2.

5. The rubber composition for a tire of claim 1, wherein said fatty acid is a monocarboxylic acid.

6. The rubber composition for a tire of claim 2, wherein said fatty acid is a monocarboxylic acid.

7. The rubber composition for a fire of claim 1, wherein said fatty acid contains at least 85% by weight of unsaturated fatty acid having at least 18 carbon atoms.

8. A pneumatic tire having a tread formed from the rubber composition for a tire of claim 5.

9. A pneumatic fire having a tread formed from the rubber composition for a tire of claim 6.

10. A pneumatic fire having a tread formed from the rubber composition for a fire of claim 7.

11. The rubber composition for a tire of claim 1, wherein the fatty acid is present in an amount of 10 to 60 parts by weight based on 100 parts by weight of the rubber component.

12. A pneumatic tire having a tread formed from the rubber composition for a tire of claim 11.

13. The rubber composition for a fire of claim 1, wherein 30 to 60 parts by weight of said fatty acid are present based on 100 parts by weight of the rubber component.

14. A pneumatic tire having a tread formed from the rubber composition for a fire of claim 13.

* * * * *